(12) United States Patent
Kawazu et al.

(10) Patent No.: US 7,067,187 B2
(45) Date of Patent: Jun. 27, 2006

(54) SPHERICAL POROUS CERAMIC BODY AND METHOD FOR PRODUCING THE SAME

(75) Inventors: Hidekatsu Kawazu, Niihama (JP); Osamu Yamanishi, Niihama (JP)

(73) Assignee: Sumitomo Chemical Company, Limited, Osaka (JP)

( * ) Notice: Subject to any disclaimer, the term of this patent is extended or adjusted under 35 U.S.C. 154(b) by 290 days.

(21) Appl. No.: 10/097,019

(22) Filed: Mar. 14, 2002

(65) Prior Publication Data
US 2002/0169065 A1 Nov. 14, 2002

(30) Foreign Application Priority Data
Mar. 16, 2001 (JP) ............................. 2001-075719

(51) Int. Cl.
*B28B 1/00* (2006.01)
*B01J 32/00* (2006.01)

(52) U.S. Cl. ............... 428/312.2; 264/109; 264/115; 264/117; 264/128; 264/681; 428/312.8; 502/232; 502/235; 502/238; 502/415

(58) Field of Classification Search ............. 502/232, 502/235, 238, 415; 428/312.2, 312.8; 264/109, 264/115, 117, 128, 681
See application file for complete search history.

(56) References Cited

U.S. PATENT DOCUMENTS

| 3,565,830 | A | * | 2/1971 | Keith et al. ................ 502/242 |
|---|---|---|---|---|
| 4,280,845 | A | | 7/1981 | Matsuhisa et al. |
| 4,321,224 | A | * | 3/1982 | Shimizu et al. |
| 4,698,317 | A | * | 10/1987 | Inoue et al. |
| 4,775,598 | A | * | 10/1988 | Jaeckel .................... 428/403 |
| 5,055,429 | A | * | 10/1991 | James et al. ............... 501/80 |
| 5,258,150 | A | * | 11/1993 | Merkel et al. |
| 5,545,243 | A | * | 8/1996 | Kotani et al. |
| 5,559,072 | A | * | 9/1996 | Itoh et al. |
| 5,849,391 | A | * | 12/1998 | Miura et al. |
| 5,919,425 | A | * | 7/1999 | Nguyen et al. ............. 423/210 |
| 6,210,625 | B1 | * | 4/2001 | Matsushita et al. ............ 419/5 |
| 6,616,873 | B1 | * | 9/2003 | Duraiswami et al. ......... 264/44 |
| 6,641,907 | B1 | * | 11/2003 | Merrill et al. ........... 428/313.9 |

FOREIGN PATENT DOCUMENTS

| DE | 19603196 | * | 8/1997 |
|---|---|---|---|
| EP | 524663 | * | 1/1993 |
| EP | 0 918 045 A1 | | 5/1999 |
| JP | 63-143421 A1 | | 6/1988 |
| JP | 11-253742 | * | 9/1999 |

* cited by examiner

*Primary Examiner*—Archene Turner
(74) *Attorney, Agent, or Firm*—Birch, Stewart, Kolasch & Birch, LLP

(57) ABSTRACT

A spherical porous ceramic body and the production method thereof are provided. As to the porous ceramic body, the total volume of the pores having a pore radius of from 1.8 nm to 100 μm is about 0.25 cm³/g or more, the mode of pore radius of the pores is from about 1 μm to about 6 μm and the packing density is from about 0.7 g/cm³ to about 1 g/cm³. The porous ceramic body is suitably used as a carrier for a catalyst and has high mechanical strength.

12 Claims, 3 Drawing Sheets

SPHERICAL POROUS CERAMIC BODY AND METHOD FOR PRODUCING THE SAME

FIELD OF THE INVENTION

The present invention relates to a spherical porous ceramic body and a method for producing the porous ceramic body.

BACKGROUND OF THE INVENTION

Porous bodies of ceramic such as cordierite, mullite and titanium nitride have been used as a carrier for an exhaust gas-cleaning catalyst, a carrier for petroleum-refining catalyst and a carrier for a catalyst for petrochemical reactions. Moreover, some of the porous ceramic bodies have been utilized also as a carrier for a $NO_x$ adsorbent.

Conventionally, it has been known that porous ceramic bodies may have various shapes such as sphere, honeycomb and ring. Also, it has been proposed that the porous ceramic bodies may have various compositions. Furthermore, in order to improve the physical properties of the porous ceramic bodies, various kinds of improved production methods have been proposed.

In addition, from demands for catalyst life extension and the like, much more improvement in strength has been required for the spherical porous ceramic bodies in recent years.

SUMMARY OF THE INVENTION

The object of the present invention is to provide a spherical porous ceramic body that has a high mechanical strength while maintaining physical properties required for a carrier for a catalyst. Another object of the present invention is to provide a simple method for producing such a spherical porous ceramic body.

The inventors of the present invention have accomplished the present invention through their study on improvement in mechanical strength of spherical ceramic articles.

The present invention provides a spherical porous ceramic body wherein the total volume of the pores having a pore radius of from 1.8 nm to 100 μm is about 0.25 cm³/g or more, the mode of pore radius of the pores is from about 1 μm to about 6 μm and the packing density is from about 0.7 g/cm³ to about 1 g/cm³. The spherical porous ceramic body, which has such fine pores and has such a mode of pore radius thereof and a packing density within such ranges as respectively described above, can attain a high mechanical strength while maintaining physical properties demanded as a carrier for a catalyst.

Moreover, the present invention provides a method for producing a spherical porous ceramic body, the method comprising the steps of subjecting a mixed powder containing an inorganic oxide having rehydratability and at least one other inorganic compound to rolling granulation to obtain a granulate; and calcining the granulate.

DETAILED DESCRIPTION OF THE INVENTION

Figure 1:
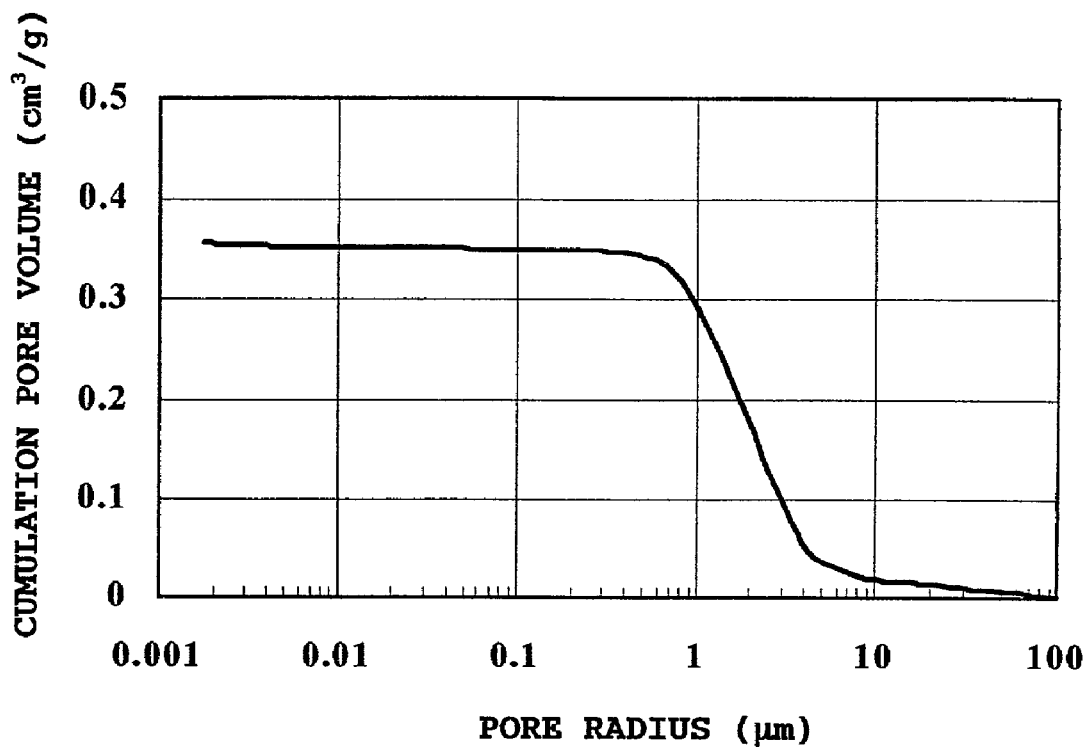
FIG. 1 is a cumulative pore distribution curve of a porous body of the present invention (see, Example 1).

A porous ceramic body of the present invention may be spherical and may have an internal structure described below. The porous ceramic body may have fine pores such that the total volume of the pores having a radius of from 1.8 nm to 100 μm is about 0.25 cm³/g or more. The greater the volume of the above-mentioned pores the better, since the amount of the catalyst to be carried on the ceramic body can be increased. It is preferred that the total volume of those pores is about 0.3 cm³/g or more. On the other hand, since mechanical strength may deteriorate when the total volume of those pores becomes too large, it is preferred that the total volume of those pores is about 0.4 cm³/g or less. The volume of pores can be measured by the mercury penetration method.

The porous ceramic body of the present invention may have a mode of pore radius in a range of from about 1 μm to about 6 μm. The mode of pore radius is a value showing a pore radius of pores which exist most in the spherical porous body. For example, when measuring the distribution of pore radius of from 1.8 nm to 100 μm by the mercury penetration method, the mode of pore radius can be expressed by the pore radius having a maximum peak in a frequential pore distribution curve with the pore radius as abscissa against the differential pore volume (which is obtained by differentiating the cumulated pore distribution) as ordinate. The mode of pore radius is preferably about 2 μm or more, is more preferably about 2.5 μm or more, and is also preferably about 4 μm or less.

The spherical porous ceramic body of the present invention may have a packing density of from about 0.7 g/cm³ to about 1 g/cm³. The packing density used herein is the apparent density of spherical porous ceramic body, which may be measured after placing the ceramic body in a container and then vibrating the container. When the packing density of the spherical porous ceramic body is less than about 0.7 g/cm³, a catalyst comprising the spherical porous ceramic body which carries a catalyst component may be easily fluidized in a fixed bed type reaction tower and, therefore, it may become difficult to carry out reaction therein with stability. On the other hand, when the packing density of the spherical porous ceramic body exceeds about 1 g/cm³, the packing density of a catalyst comprising the ceramic body becomes high so that the weight of the catalyst per unit volume increases. This may cause the necessity of enhancing the rigidity of a reaction tower in which the ceramic body is placed and, therefore, the flexibility in reaction tower design may be reduced.

The spherical porous ceramic body of the present invention does not need to have a shape of true sphere, but preferably has the shape of or the shape close to a true sphere. There is a shape factor which can show the degree how close to a true sphere a spherical porous ceramic body is. The shape factor used herein is a value calculated by the formula:

$$\text{Shape factor} = L^2/(4 \times \pi \times A)$$

wherein A and L represent the projected area and the projected perimeter of the spherical porous ceramic body, respectively, both of which are measured by image analysis. If a spherical porous ceramic body has a shape of a true sphere, it has a shape factor of 1. As a spherical porous ceramic body becomes far away from a true sphere, its shape factor becomes greater. The spherical porous ceramic body of the present invention preferably has a shape factor of about 1.1 or less. When the shape factor exceeds about 1.1, the spherical porous ceramic body tends to become a powder in a reaction tower. Further, the spherical porous ceramic body of the present invention preferably has an average particle diameter of not less than about 0.5 mm and not greater than about 10 mm. When the ceramic body having the average particle diameter of less than about 0.5 mm is filled in a reaction tower, the pressure loss caused by the spherical porous ceramic body tends to become great. On the other hand, when the average particle diameter exceeds about 10 mm, a catalyst obtained by carrying catalyst component onto the spherical porous ceramic body tends to have insufficient catalytic activity. Moreover, the spherical porous ceramic body preferably has a BET specific surface area of about 10 m$^2$/g or less.

The spherical porous ceramic bodies in the present invention may have a variety of crystal phases. The suitable crystal phase depends on the usage of the ceramic bodies and the operating environment. Examples of the crystal phase include cordierite (of which theoretical composition is $2MgO \cdot 2Al_2O_3 \cdot 5SiO_2$ and its crystal system is a rhombic system), indialite (of which theoretical composition is $2MgO \cdot 2Al_2O_3 \cdot 5SiO_2$ and its crystal system is a hexagonal system), mullite (of which theoretical composition is $3Al_2O_3 \cdot 2SiO_2$), titanium nitride (of which theoretical composition is TiN) and barium-based oxides (such as $Ba_3Y_4O_9$ and $BaLa_2O_4$). Preferable examples are cordierite and indialite. A spherical porous ceramic body which has a polycrystal structure and of which the major crystal phase is cordierite or indialite is excellent in resistance to thermal shock. The crystal phase can be identified from the peak data of an X-ray diffraction spectrum (which is obtained by X-ray diffraction analysis) of the spherical porous ceramic body. A major crystal phase can be determined from the relative peak intensity of the X-ray diffraction spectrum. The composition of the spherical porous ceramic body is not limited and varies depending upon the crystal phase. For example, when the major crystal phase is cordierite or indialite, it is preferred that the composition of the spherical porous ceramic body has a ratio within the following ranges: an MgO content of from 12% by weight to 16% by weight, an $Al_2O_3$ content of from 25% by weight to 50% by weight and an $SiO_2$ contents of from 34% by weight to 64%, which is nearly the theoretical compositions of the major crystal phases, namely, an MgO content of 13.7% by weight, an $Al_2O_3$ content of 34.9% by weight and an $SiO_2$ content of 51.4% by weight.

The spherical porous ceramic body of the present invention may contain glass such as borosilicate glass, inorganic binders such as potassium silicate and sodium silicate and inorganic fibers such as silica fiber, alumina fiber, titania fiber and silicon carbide fiber.

The spherical porous ceramic body of the present invention has a high mechanical strength, which may be about 1000 N/cm$^2$ or more and is preferably about 2000 N/cm$^2$ in terms of collapse strength. The spherical porous ceramic body may be abrasion-resistant. For example, when the spherical porous ceramic body is vibrated for 15 minutes using a screen vibrator, the abrasion rate (which is expressed by the rate of the loss weight shaved off by abrasion to the original weight of the ceramic body) may be about 1% or less and is preferably about 0.5% or less.

The spherical porous ceramic body may be produced using an inorganic oxide such as a metal oxide having rehydratability. Examples of such a metal oxide include an aluminum oxide, a magnesium oxide, a barium oxide, a lanthanum oxide and an yttrium oxide. By the "rehydratability" used herein is meant a characteristic that an inorganic oxide reacts to become an inorganic hydroxide when the inorganic oxide is brought into contact with water or water steam at a temperature of from room temperature to 200° C. For example, when an aluminum oxide having rehydratability is brought into contact with water at a temperature of from room temperature to 100° C., it reacts to become an aluminum hydroxide. Inorganic oxides suitable for producing a spherical porous ceramic body are selected depending on the composition of the porous body to be aimed. For example, for obtaining a porous ceramic body which contains cordierite or indialite as its major crystal phase, an aluminum oxide may be utilized. In this case, it is preferred to use an active aluminum oxide obtained by a method comprising instant provisional calcination of aluminum hydroxide. The crystal structure of the active aluminum oxide may be ρ alumina type or η alumina type. The active aluminum oxide can be prepared by introducing a gibbsite-type aluminum hydroxide powder into a high-temperature air current at a temperature of from 500° C. to 1200° C. with a linear velocity of approximately from about 5 m/s to about 50 m/s and maintaining it for approximately from about 0.1 to about 10 seconds, thereby treating it with heat so that the ignition loss of the powder becomes from about 3% by weight to about 10% by weight.

The average particle diameter of the inorganic oxide used for producing the porous ceramic body is preferably not less than 1 μm and not greater than 20 μm.

In the production of the porous ceramic body, in addition to the above-mentioned inorganic oxide, is used at least one other inorganic compound which may be selected depending on the composition of a porous ceramic body to be aimed. Examples of the inorganic compound that serves as an aluminum source include an aluminum hydroxide, an aluminum oxide having γ, χ, θ, δ, κ or α-type crystal structure, an amorphous alumina sol, an alumina gel, a non-crystalline alumina, an aluminum sulfate, an aluminum nitrate, an aluminum chloride, a kaolin (of which typical composition is $Al_2O_3 \cdot 2SiO_2 \cdot 2H_2O$) and mullite (of which theoretical composition is $3Al_2O_3 \cdot 2SiO_2$). Examples of the inorganic compound that serves as a magnesium source include a talc (of which typical composition is $3MgO \cdot 4SiO_2 \cdot H_2O$), a magnesium carbonate, a magnesium hydroxide and a magnesium oxide. Examples of the inorganic compound that serves as a silicon source include a silica gel, a silica sol and a quartz. Since the above-listed kaolin, mullite and talc contain silicon, they can be used also as a silicon source. As for inorganic compounds which serve as a titanium source, a barium source, a yttrium source, a lanthanum source and/or the like, compounds containing those elements (such as titanium, barium, yttrium, lanthanum and/or the like) may be selectively used. The "other inorganic compound" to be used may have an average particle diameter of not less than about 1 µm and not greater than about 20 µm.

In the present invention, the inorganic oxide having rehydratability may be mixed with the at least one other inorganic compound to obtain a mixed powder thereof. The mixing can be performed using various types of container-rolling-type mixers such as a level-cylinder-type mixer, an inclined-cylinder-type mixer, a V-shape-type mixer, a double conical-type mixer, a cubic-type mixer, an S-shape-type mixer and a continuous V-shape-type mixer; mechanically stirring type mixers such as a ribbon-type mixer, a screw-type mixer, a rod-type mixer, a pin-type mixer, a double-shaft paddle-type mixer, a conical screw-type mixer, a high-speed flow-type mixer, a rotary disc-type mixer and a muller-type mixer; air flow type mixers such as a moving bed-type mixer and a fluidized bed-type mixer; or vibration type mixers. It is preferred to conduct the mixing of the inorganic oxide having rehydratability with the at least one other inorganic compound so that the amount of inorganic oxide having rehydratability may be about 5% by weight or more, and is preferably about 10% by weight or more, based on the total amount of the inorganic oxide having rehydratability and the other inorganic compound. Also, the amount of inorganic oxide having rehydratability may be about 25% by weight or less, and is preferably about 20% by weight or less, based on the total amount of the inorganic oxide having rehydratability and the other inorganic compound. During the mixing, may be added organic substances such as celluloses and plant fruit shell, inorganic substances such as ammonium sulfate and ammonium nitrate. By the addition thereof, the pore distribution of the resulting porous ceramic body can be controlled. The addition amounts of such organic substances and/or inorganic substances may be about 2 parts by weight or more, and is preferably about 5 parts by weight or more, and may be about 20 parts by weight or less, and is preferably about 10 parts by weight or less, based on 100 parts by weight of the total amount of the inorganic oxide having rehydratability and the other inorganic compound. These organic substances and inorganic substances may have a particle shape having an average particle diameter of from about 1 µm to about 100 µm.

In the present invention, the mixed powder obtained above may be granulated. The granulation can be conducted by a rolling granulation method. The rolling granulation is a method comprising feeding a raw material powder continuously into a rolling container while spraying a liquid binder such as water to the material, thereby forming aggregates of the material. For the rolling granulation, a granulator such as a pan granulator and a drum granulator may be used. The granulation is preferably conducted with adding a granulation nucleus. The addition of the granulation nucleus can render the particle diameters of the resulting granulates uniform and makes it possible to efficiently obtain the granulates having a desired particle diameter. The particle diameter and the addition amount of the granulation nucleus may be determined depending on the average particle diameter of an aimedporous ceramic body. For example, for producing aporous ceramic body which has an average particle diameter of from about 1 mm to about 2 mm, the particle diameter of the granulation nucleus to be added may be about 0.1 mm or more and is preferably about 0.5 mm or more, and may be about 1 mm or less and is preferably about 0.8 mm or less; and the addition amount thereof may be not less than about 5% by weight and not more than about 15% by weight based on the amount the mixed powder to be granulated.

The granulate obtained above is preferably subjected to consolidation spherization. The consolidation spherization is an operation comprising applying a compression action to a granulate to increase its apparent density and to spherize the granulate. This consolidation spherization can be conducted using, for example, a high-speed centrifugal rolling machine, a drum rotating machine or the above-described mechanically stirring-type mixers. By the consolidation spherization, a porous ceramic body having a high mechanical strength and a low abrasion rate can be obtained. The consolidation spherization is preferably carried out immediately after the granulation by the rolling granulation method. If a granulate is left in atmospheric air for a long period of time, a rehydration reaction of the inorganic oxide in the granulate tends to proceed to harden the granulate. When such a hardened granulate is subjected to consolidation spherization, the resulting granulate may become powdered.

The granulate may be subjected to aging, if needed. The aging can be conducted, for example, by a method comprising maintaining a granulate in the presence of water or water steam. The aging may cause a rehydration reaction of an inorganic oxide having rehydratability in the granulate, thereby further enhancing the mechanical strength of the resulting porous ceramic body. The aging temperature may be not lower than about 50° C. and not higher than about 200° C. When the aging temperature is lower than about 50° C., it takes much time to complete the rehydration reaction of the inorganic oxide. On the other hand, when the aging temperature is higher than about 200° C., the effect of aging, that is, improvement in mechanical strength may be insufficient or may cause reduction in mechanical strength of the resulting porous ceramic body.

In the present invention, the granulate thus obtained (which may be obtained after the consolidation spherization and/or the aging, if necessary) is calcined to obtain a porous ceramic body. The calcination may be conducted using, for example, a box-type electric furnace, a tunnel furnace, a far-infrared furnace, a microwave-heating furnace, a shaft furnace, a reverberating furnace and the like. The calcining temperature may be not lower than about 1100° C. and not higher than about 1400° C. The calcining time may be not shorter than about 10 minutes and not longer than about 24 hours. A heat source for calcination is preferably heating gas containing water steam, such as a combustion gas. When the calcination is conducted using such a heating gas, a porous ceramic body excellent in mechanical strength can be obtained.

The porous ceramic body obtained after the calcinations, specifically the surface thereof, may be polished.

In accordance with the present invention, a spherical porous ceramic body, which is suitably used as a carrier for a catalyst and has a high mechanical strength, is obtained. Further, by the production method of the spherical porous ceramic body in the present invention, such a spherical porous ceramic body can be easily obtained.

The invention being thus described, it will be apparent that the same may be varied in many ways. Such variations are to be regarded as within the spirit and scope of the invention, and all such modifications as would be apparent to one skilled in the art are intended to be within the scope of the following claims.

The entire disclosure of Japanese Patent Application No. 2001-75719 filed on Mar. 16, 2001, indicating specification, claims, drawings and summary, is incorporated herein by reference in their entirety.

EXAMPLES

The present invention is described in more detail by following Examples, which should not be construed as a limitation upon the scope of the present invention.

Spherical porous ceramic body was evaluated by pore volume, mode of pore radius, packing density, crystal phase, shape factor, BET specific surface area, chemical composition, mechanical strength and/or abrasion rate, all of which were obtained by the methods below.

Pore volume ($cm^3/g$) and Mode of Pore Radius ($\mu m$)

The pore distribution of a sample spherical porous ceramic body was measured by the mercury penetration method using a pore distribution measuring apparatus (tradename "Autoscan 33 type", produced by Quantachrome Corp.). Based on the pore distribution, were obtained a cumulative pore distribution curve with a pore radius as abscissa against a cumulative pore volume as ordinate and a frequential pore distribution curve with a pore radius as abscissa against a differential pore volume as ordinate. From the cumulative pore distribution curve, was calculated the cumulative volume of the pores having a pore radius of from 1.8 nm to 100 $\mu m$. The value (of pore radius) at which the intensity of the frequential pore distribution curve has a maximum peak was determined as a mode of pore radius of the porous ceramic body. It is noted that the cumulative pore volume (on the ordinate) of the cumulative pore volume curve was obtained by sequentially cumulating the pore volume from the larger pore towards the smaller pore, the pore having a pore radius of from 100 $\mu m$ to 1.8 nm.

Packing Density ($g/cm^3$)

A cylinder (200 $cm^3$) was charged with 100 g of a sample spherical porous ceramic body. The cylinder containing the sample was fallen 100 times repeatedly from a height of 30 mm, and then the volume (V ($cm^3$)) of the sample was measured. Packing density of the sample was calculated using the following formula:

Packing density ($g/cm^3$)=100 (g)/V($cm^3$)

Crystal Phase

A sample spherical porous ceramic body was analyzed with an X-ray diffraction apparatus (tradename "RAD-RB RU-200", produced by Rigaku Corp.) to obtain an X-ray diffraction spectrum. Crystal phases of the sample were identified from the peak intensity shown in the X-ray diffraction spectrum. Among the crystal phases identified, one with the highest relative peak intensity was determined as a major crystal phase.

Shape Factor

For each of 60 to 80 samples of the spherical porous ceramic body to be evaluated, was respectively measured the projected image with an image analyzer (tradename "PIAS-II", produced by PIAS Company), to obtain a projected area (A) and a projected perimeter (L) of the projected image. Shape factor for each of 60 to 80 samples was respectively calculated by the formula below:

Shape factor=$L^2/(4\times\pi\times A)$

Shape factor of the spherical porous ceramic body is expressed by an average of the shape factors of the 60 to 80 samples. BET specific surface area ($m^2/g$):

BET specific surface area of a sample spherical porous ceramic body was measured by the nitrogen adsorption method.

Chemical Composition

The contents (% by weight) of MgO, $Al_2O_3$, $SiO_2$, CaO, $Fe_2O_3$ and $TiO_2$ in a sample spherical porous ceramic body were measured using an inductively coupled plasma emission spectral analyzer.

Mechanical Strength ($N/cm^2$)

For each of 10 samples of the spherical porous ceramic body to be evaluated, was measured a diameter (D (cm)) and was determined a breaking strength (P (N)) with a compression tester. Mechanical strength for each of 10 samples was calculated by the formula below:

Mechanical strength=$4\times P/(\pi\times D^2)$

Mechanical strength of the spherical porous ceramic body is expressed by an average of the mechanical strengths of the 10 samples.

Abrasion Rate (%)

50 g of a sample spherical porous ceramic body and five copper discs (having 23 mm in diameter and 1.5 mm in thickness) were put into a screen with openings of 850 $\mu m$. Under the screen, were stacked sequentially another screen with openings of 355 $\mu m$ and a saucer. The upper screen was covered with a lid. After fixing these items thus assembled together to a screen shaker, the shaker was caused to run for 15 minutes. Then, the weight (W (g)) of the sample falling to the saucer was measured. An abrasion rate of the sample was calculated using the following formula:

Abrasion rate=$W/50\times100$

Example 1

Aluminum hydroxide obtained by hydrolyzing a sodium aluminate solution was supplied into a 700° C. heating gas and was provisionally calcined, to obtain a provisionally calcined body. The provisionally calcined body was grinded to obtain an alumina powder. In the provisionally calcinations, the ignition loss of the alumina powder was 6%. The alumina powder has an average particle diameter of 5 $\mu m$ and a crystal structure of $\rho$ alumina type. 30 parts by weight of the alumina powder, 100 parts by weight of kaolin (tradename "Kongo Kaolin" produced by Nikko Ceramics Composite Co., Ltd.), 100 parts by weight of talc (tradename "Micron White 5000SD", produced by Hayashi Kasei Co., Ltd.) and 20 parts by weight of ground fruit shell (tradename "Walnut Flour F180", produced by Nippon Walnut Co., Ltd., which has 50 $\mu m$ of an average particle diameter) were mixed with a conical screw mechanical stirring type mixer (tradename "Nauta mixer", produced by Hosokawa Micron Corporation), to prepare a mixed powder, which is a raw material for granulation.

Figure 2:
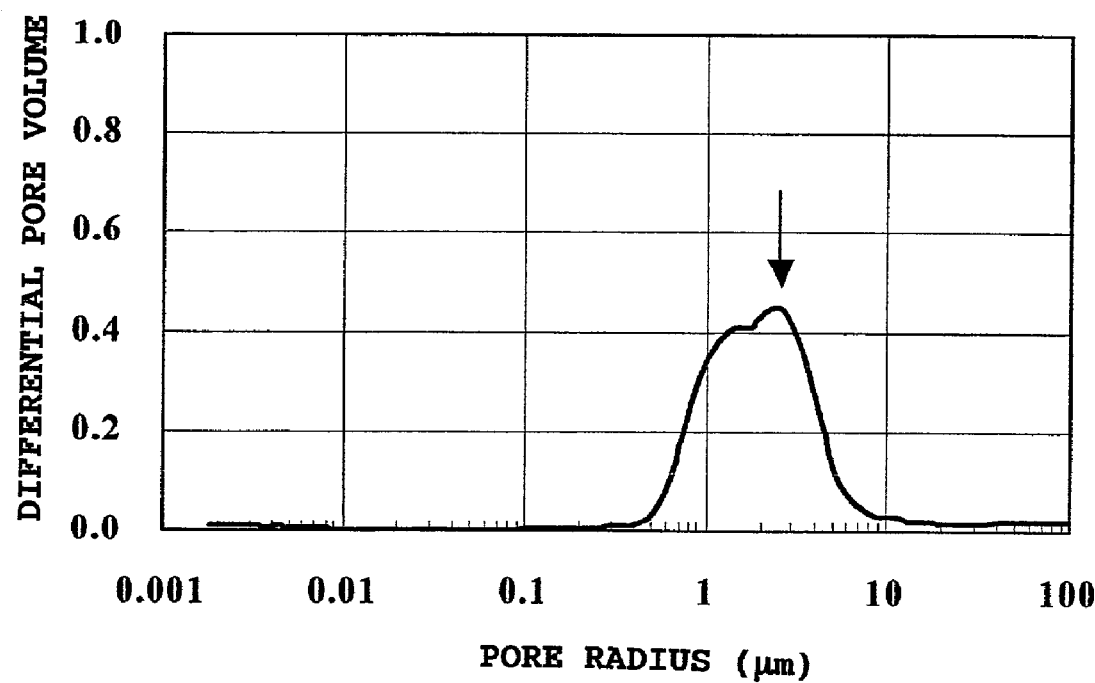
FIG. 2 is a frequential pore distribution curve of a porous body of the present invention (see, Example 1). The arrow in FIG. 2 indicates the position of the maximum peak of the curve.

Into a pan granulator that has a pan 1600 mm in diameter and can be rotated at 17 rpm, was fed the above-prepared raw material for granulation through a raw material feeding opening of the granulator. Simultaneously, 6 parts by weight, based on 100 parts by weight of the raw material, of an active alumina powder (having a particle diameter of from 0.6 mm to 0.8 mm) was supplied as a granulation nucleus to the pan granulator using a powder feeder. Rolling granulation was carried out in the granulator while spraying 50 parts by weight, based on 100 parts by weight of the raw material, of water using a spraying apparatus, to obtain granulates having a diameter of 1 mm to 2 mm. The granulates were put into a container with a lid and a steam was blown into the container. Then, the container was sealed and maintained at 80° C. for 4 hours for aging. The obtained aged granulates were screened with a screen having openings of 1.18 mm and a screen having openings of 2.36 mm. The granulates which passed through the 2.36 mm screen but remained on the 1.18 mm screen were recovered. The recovered granulates ware put into an electric furnace and ware calcined in the air at 1350° C. for 2 hours, to obtain a spherical porous ceramic body. The spherical porous ceramic body has a crystal phase of indialite as a major crystal phase and that of cordierite as an auxiliary crystal phase. The physical properties of the porous ceramic body are summarized in Table 1. The cumulative pore distribution curve of the porous ceramic body and frequential pore distribution curve thereof are shown in FIG. 1 and FIG. 2, respectively. In FIG. 2, the arrow indicates the position of the maximum peak of the curve.

Example 2

A spherical porous ceramic body was obtained in the same manner as in Example 1 except that a high-speed centrifugal rolling granulator (tradename "MARUMERIZER Q-400 type", produced by Fuji Paudal Co., Ltd.) was utilized and, before screened, the obtained aged granulates were subjected to consolidation spherization process under the condition such that the rotation speed was 300 rpm and the processing time was 5 minutes. The obtained spherical porous ceramic body has a crystal phase of indialite as a major crystal phase and that of cordierite as an auxiliary crystal phase. The physical properties of the porous ceramic body are summarized in Table 1 and the chemical composition thereof is shown in Table 2.

Example 3

A spherical porous ceramic body was obtained in the same manner as in Example 1 except that the amount of the ground fruit shell was changed from 20 parts by weight to 35 parts by weight. The obtained spherical porous ceramic body has a crystal phase of indialite as a major crystal phase and that of cordierite as an auxiliary crystal phase. The physical properties of the porous ceramic body are summarized in Table 1 and the chemical composition thereof is shown in Table 2.

Example 4

A spherical porous ceramic body was obtained in the same manner as in Example 3 except that a high-speed centrifugal rolling granulator (tradename "MARUMERIZER Q-400 type", produced by Fuji Paudal Co., Ltd.) was utilized and, before screened, the obtained aged granulates were subjected to consolidation spherization process under the condition such that the rotation speed was 300 rpm and the processing time was 5 minutes. The physical properties of the porous ceramic body are summarized in Table 1.

Example 5

A spherical porous ceramic body was obtained in the same manner as in Example 1 except that the granulates was not subjected to aging. The physical properties of the obtained porous ceramic body are summarized in Table 1.

Comparative Example 1

Figure 3:
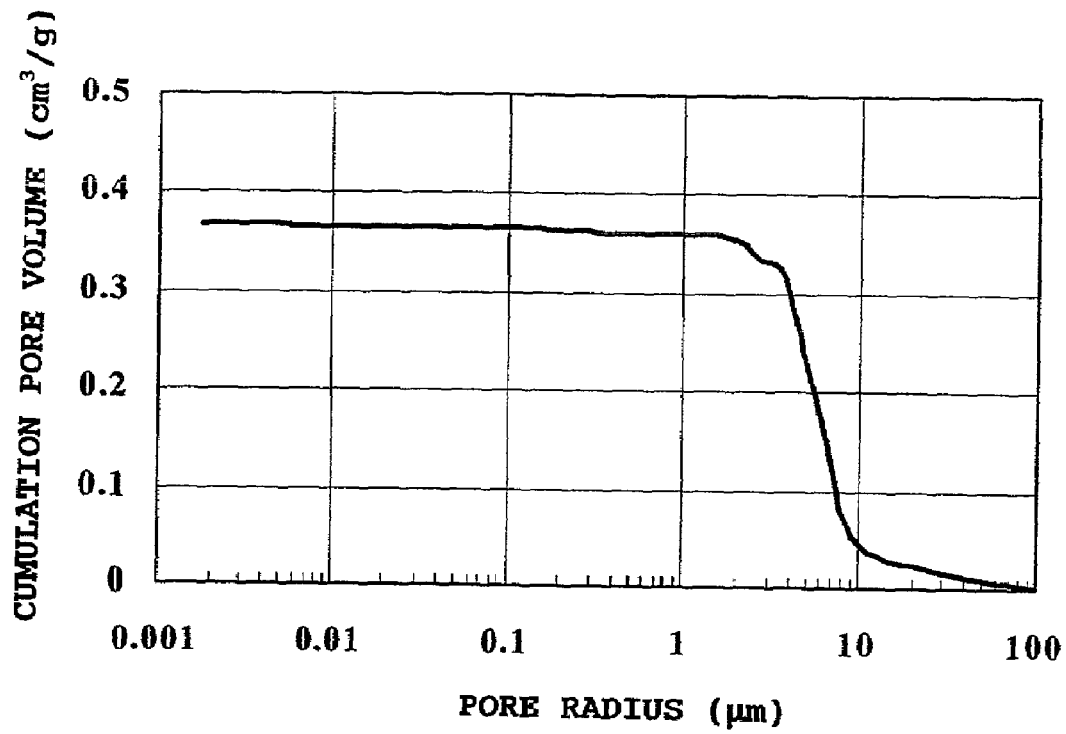
FIG. 3 is a cumulative pore distribution curve of a porous body (see, Comparative Example 1).
Figure 4:
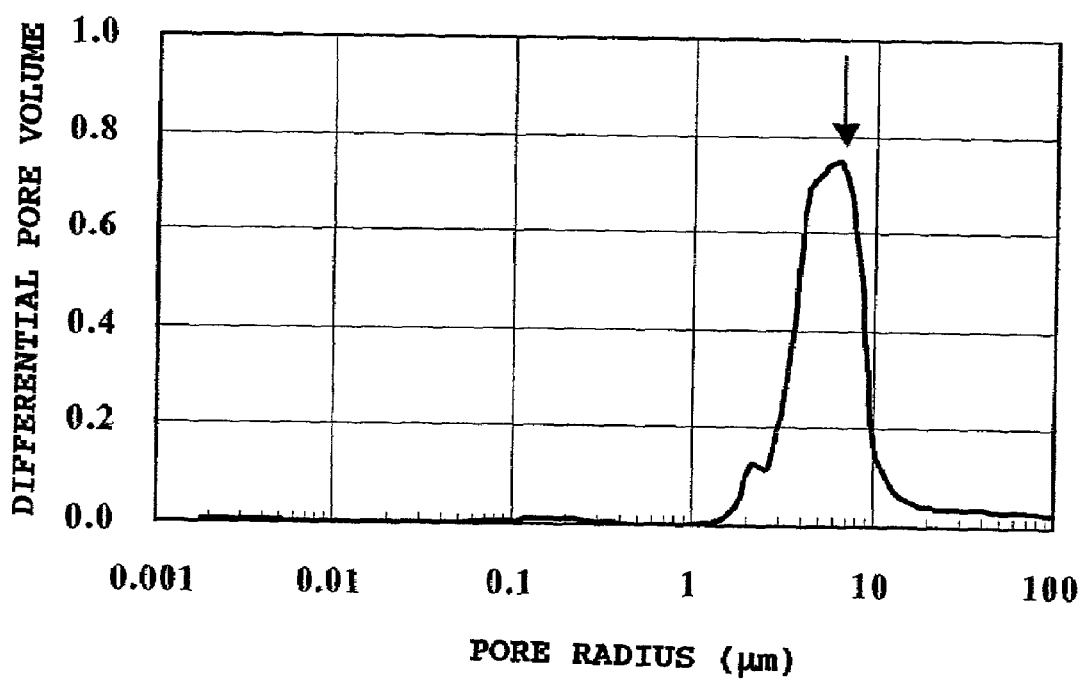
FIG. 4 is a frequential pore distribution curve of a porous body (see, Comparative Example 1). The arrow in FIG. 4 indicates the position of the maximum peak of the curve.

100 parts by weight of a raw material for granulation prepared in the same manner as in Example 1 and 50 parts by weight of water were supplied into a medium-stirring type granulator (tradename "Super Mixer", produced by Kabushiki Kaisha Kawata) and were granulated, to obtain granulates having a diameter of 1 mm to 2 mm. The granulates were put into a container with a lid and a steam was blown into the container. Then, the container was sealed and maintained at 80° C. for 4 hours for aging. The obtained aged granulates were screened with a screen having openings of 1.18 mm and a screen having openings of 2.36 mm. The granulates which passed through the 2.36 mm screen but remained on the 1.18 mm screen were recovered. The recovered granulates were put into an electric furnace and were calcined in the air at 1350° C. for 2 hours, to obtain a spherical porous ceramic body. The physical properties of the porous ceramic body are summarized in Table 1. The cumulative pore distribution curve of the porous ceramic body and frequential pore distribution curve thereof are shown in FIG. 3 and FIG. 4, respectively. In FIG. 4, the arrow indicates the position of the maximum peak of the curve.

Comparative Example 2

Figure 5:
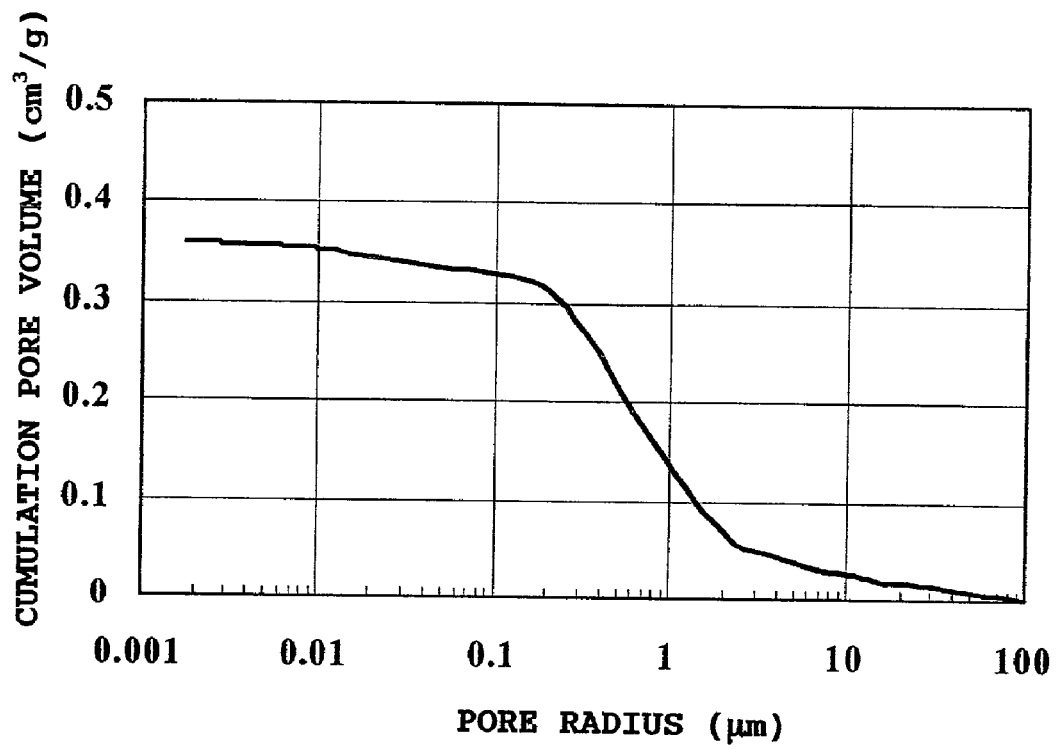
FIG. 5 is a cumulative pore distribution curve of another porous body (see, Comparative Example 2).
Figure 6:
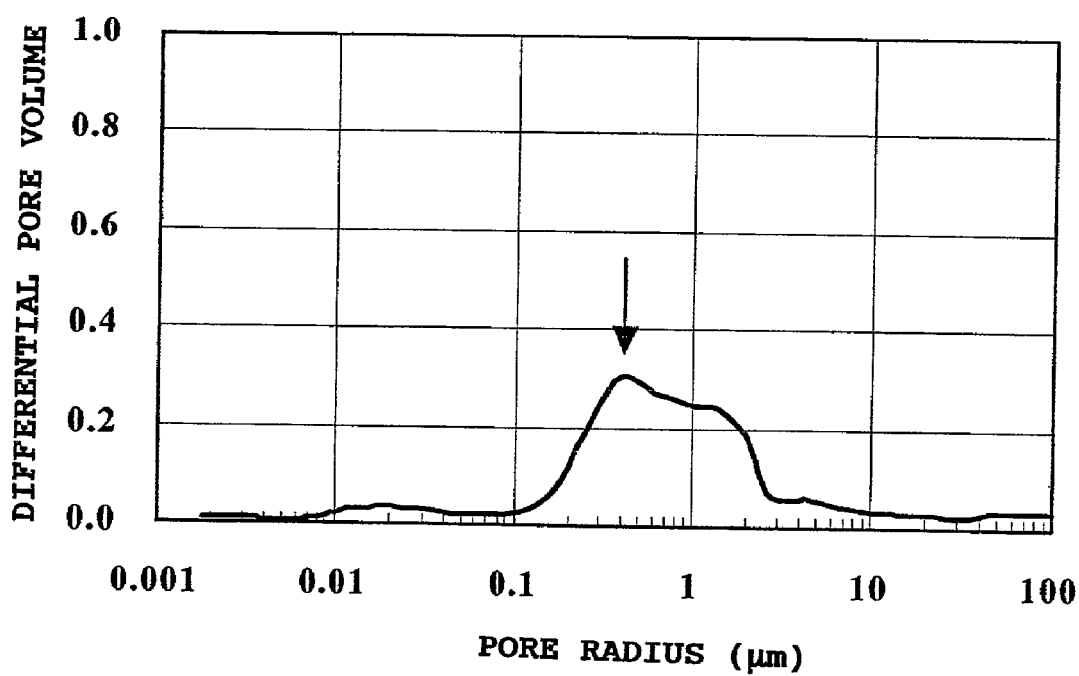
FIG. 6 is a frequential pore distribution curve of another porous body (see, Comparative Example 2). The arrow in FIG. 6 indicates the position of the maximum peak of the curve.

A spherical porous ceramic body was obtained in the same manner as in Comparative Example 1 except that the amount of the ground fruit shell was changed from 20 parts by weight to 35 parts by weight. The physical properties of the obtained porous ceramic body are summarized in Table 1. A cumulative pore distribution curve of the porous ceramic body and a frequential pore distribution curve thereof are shown in FIG. 5 and FIG. 6, respectively. In FIG. 6, the arrow indicates the position of the maximum peak of the curve.

TABLE 1

| | Pore volume (cm³/g) | Mode of pore radius (μm) | Packing density (g/cm³) | Shape factor | BET specific surface area (M²/g) | Mechanical strength (N/cm²) | Abrasion rate (%) |
|---|---|---|---|---|---|---|---|
| Example 1 | 0.36 | 2.7 | 0.82 | 1.14 | 0.2 | 2200 | 0.5 |
| Example 2 | 0.36 | 2.7 | 0.84 | 1.03 | 0.3 | 2150 | 0.4 |
| Example 3 | 0.39 | 5.3 | 0.77 | 1.00 | Not measured | 1520 | 1.0 |
| Example 4 | 0.39 | 4.3 | 0.78 | 1.01 | 0.3 | 1470 | 0.5 |
| Example 5 | 0.40 | 1.9 | 0.84 | 1.14 | 0.3 | 1000 | 0.6 |
| Comparative Example 1 | 0.37 | 6.7 | 0.81 | Not measured | Not measured | 900 | 0.7 |
| Comparative Example 2 | 0.36 | 0.4 | 0.93 | Not measured | Not measured | 740 | 0.4 |

TABLE 2

| | Chemical Composition (% by weight) | | | | | | |
|---|---|---|---|---|---|---|---|
| | MgO | Al$_2$O$_3$ | SiO$_2$ | CaO | Fe$_2$O$_3$ | TiO$_2$ | Others |
| Example 2 | 15.5 | 32.5 | 50.4 | 0.4 | 0.3 | 0.1 | 0.8 |
| Example 3 | 13.6 | 36.4 | 48.2 | 0.6 | 0.3 | 0.1 | 0.8 |

What is claimed is:

1. A spherical porous ceramic body wherein the total volume of the pores having a pore radius of from 1.8 nm to 100 μm is about 0.25 cm$^3$/g or more, the mode of pore radius of the pores is from about 1 μm to about 6 μm and the packing density is from about 0.7 g/cm$^3$ to about 1 g/cm$^3$.

2. The spherical porous ceramic body according to claim 1, wherein the, porous ceramic body has a polycrystal structure and the a major crystal phase thereof is cordierite or indialite.

3. The spherical porous ceramic body according to claim 1, wherein the porous ceramic body has a shape factor of about 1.1 or less, the shape factor being calculated by the formula:

$$\text{Shape factor} = L^2/(4 \times \pi \times A)$$

wherein A and L represent the projected area and the projected perimeter of a spherical porous ceramic body, respectively, both of which are measured by image analysis.

4. The spherical porous ceramic body according to any one of claims 1 to 3, wherein the porous ceramic body has an average particle diameter of from about 0.5 mm to about 10 mm.

5. The spherical porous ceramic body according to any one of claims 1 to 3, wherein the porous ceramic body has a BET specific surface area of about 10 m$^2$/g or less.

6. The spherical porous ceramic body according to claim 1, wherein the porous ceramic body has a polycrystal structure and the a major crystal phase thereof is indialite.

7. A method for producing a spherical porous ceramic body, the method comprising the steps of subjecting a mixed powder containing an inorganic oxide having rehydratability and at least one other inorganic compound to rolling granulation to obtain a granulate and calcining the granulate to obtain a spherical porous ceramic body wherein the total volume of the pores having a pore radius of from 1.8 nm to 100 μm is about 0.25 cm$^3$/g or more, the mode of pore radius of the pores is from about 1 μm to about 6 μm and the packing density is from about 0.7 g/cm$^3$ to about 1 g/cm$^3$.

8. The method according to claim 7, wherein the inorganic oxide having rehydratability is aluminum oxide.

9. The method according to claim 7 or 8, wherein the granulate is aged before the calcination.

10. The method according to claim 9, wherein the aging is performed in the presence of water or water steam.

11. The method according to claim 7 or 8, wherein the granulate obtained after the rolling granulation is subjected to consolidation spherization.

12. The method according to claim 7 or 8, wherein the calcined body obtained after the calcination is subjected to surface polishing.

* * * * *